US007356735B2

(12) United States Patent
Bennett et al.

(10) Patent No.: US 7,356,735 B2
(45) Date of Patent: Apr. 8, 2008

(54) PROVIDING SUPPORT FOR SINGLE STEPPING A VIRTUAL MACHINE IN A VIRTUAL MACHINE ENVIRONMENT

(75) Inventors: Steven M. Bennett, Hillsboro, OR (US); Andrew V. Anderson, Hillsboro, OR (US); Erik Cota-Robles, Portland, OR (US); Stalinselvaraj Jeyasingh, Beaverton, OR (US); Alain Kägi, Portland, OR (US); Gilbert Neiger, Portland, OR (US); Richard Uhlig, Hillsboro, OR (US); Sanjoy K. Mondal, San Marcos, TX (US); Jason Brandt, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 484 days.

(21) Appl. No.: 10/814,569

(22) Filed: Mar. 30, 2004

(65) Prior Publication Data
US 2005/0240819 A1 Oct. 27, 2005

(51) Int. Cl.
*G06F 11/00* (2006.01)
(52) U.S. Cl. .............................. 714/34; 714/38; 714/45; 718/1
(58) Field of Classification Search ...................... 718/1
See application file for complete search history.

(56) References Cited

U.S. PATENT DOCUMENTS

| 3,699,532 | A | 10/1972 | Schaffer et al. |
|---|---|---|---|
| 3,996,449 | A | 12/1976 | Attanasio et al. |
| 4,037,214 | A | 7/1977 | Birney et al. |
| 4,162,536 | A | 7/1979 | Morley |
| 4,207,609 | A | 6/1980 | Luiz et al. |
| 4,247,905 | A | 1/1981 | Yoshida et al. |
| 4,276,594 | A | 6/1981 | Morley |
| 4,278,837 | A | 7/1981 | Best |
| 4,307,447 | A | 12/1981 | Provanzano et al. |

(Continued)

FOREIGN PATENT DOCUMENTS

DE        4217444        12/1992

(Continued)

OTHER PUBLICATIONS

Rosenberg, Jonathan B., "How Debuggers Work (Algorithms, Data Structures, and Architecture)," Chapters 3 and 5 Hardware Debugger Facilities, Wiley Computer Publishing, United States, 1996, pp. 42-43, 95, 96 and 99.

(Continued)

*Primary Examiner*—Yolanda L Wilson
(74) *Attorney, Agent, or Firm*—Blakely, Sokoloff, Taylor & Zafman LLP

(57) ABSTRACT

Methods and systems to provide support for single stepping a virtual machine in a virtual machine environment are disclosed. An exemplary method may include receiving a request to transition control to a virtual machine (VM) from a virtual machine monitor (VMM), determining that a single-stepping indicator is set to a single stepping value, and transitioning control to the VM. Further, if an execution of a first instruction in the VM completes successfully, control is transitioned to the VMM following the successful completion of the execution of the first instruction.

30 Claims, 5 Drawing Sheets

U.S. PATENT DOCUMENTS

| | | |
|---|---|---|
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,403,283 A | 9/1983 | Myntti et al. |
| 4,419,724 A | 12/1983 | Branigin et al. |
| 4,430,709 A | 2/1984 | Schleupen et al. |
| 4,521,852 A | 6/1985 | Guttag |
| 4,571,672 A | 2/1986 | Hatada et al. |
| 4,621,318 A | 11/1986 | Maeda |
| 4,759,064 A | 7/1988 | Chaum |
| 4,795,893 A | 1/1989 | Ugon |
| 4,802,084 A | 1/1989 | Ikegaya et al. |
| 4,825,052 A | 4/1989 | Chemin et al. |
| 4,907,270 A | 3/1990 | Hazard |
| 4,907,272 A | 3/1990 | Hazard |
| 4,910,774 A | 3/1990 | Barakat |
| 4,974,159 A | 11/1990 | Hargrove et al. |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Hotley et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,522,075 A * | 5/1996 | Robinson et al. ............ 718/100 |
| 5,528,231 A | 6/1996 | Patarin |
| 5,533,126 A | 7/1996 | Hazard et al. |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubala |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,633,929 A | 5/1997 | Kaliski, Jr. |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. |
| 5,740,178 A | 4/1998 | Jacks et al. |
| 5,752,046 A | 5/1998 | Oprescu et al. |
| 5,757,919 A | 5/1998 | Herbert et al. |
| 5,764,969 A | 6/1998 | Kahle |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal et al. |
| 5,901,225 A | 5/1999 | Ireton et al. |
| 5,903,752 A | 5/1999 | Dingwall et al. |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,944,821 A | 8/1999 | Angelo |
| 5,953,502 A | 9/1999 | Helbig, Sr. |
| 5,956,408 A | 9/1999 | Arnold |
| 5,970,147 A | 10/1999 | Davis et al. |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Isley |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,249,872 B1 | 6/2001 | Wildgrube et al. |
| 6,252,650 B1 | 6/2001 | Nakaumra |
| 6,269,392 B1 | 7/2001 | Cotichini et al. |
| 6,272,533 B1 | 8/2001 | Browne et al. |
| 6,272,637 B1 | 8/2001 | Little et al. |
| 6,275,933 B1 | 8/2001 | Fine et al. |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett |
| 6,301,646 B1 | 10/2001 | Hostetter |

| | | | | | | |
|---|---|---|---|---|---|---|
| 6,308,270 | B1 | 10/2001 | Guthery et al. | EP | 1030237 | 8/2000 |
| 6,314,409 | B2 | 11/2001 | Schneck et al. | EP | 1055989 | 11/2000 |
| 6,321,314 | B1 | 11/2001 | Van Dyke | EP | 1056014 | 11/2000 |
| 6,327,652 | B1 | 12/2001 | England et al. | EP | 1085396 | 3/2001 |
| 6,330,670 | B1 | 12/2001 | England et al. | EP | 1146715 | 10/2001 |
| 6,339,815 | B1 | 1/2002 | Feng | EP | 1209563 | 5/2002 |
| 6,339,816 | B1 | 1/2002 | Bausch | EP | 1271277 | 1/2003 |
| 6,357,004 | B1 | 3/2002 | Davis | JP | 2000076139 | 3/2000 |
| 6,363,485 | B1 | 3/2002 | Adams | WO | WO9524696 | 9/1995 |
| 6,374,286 | B1 | 4/2002 | Gee et al. | WO | WO9729567 | 8/1997 |
| 6,374,317 | B1 | 4/2002 | Ajanovic et al. | WO | WO9812620 | 3/1998 |
| 6,378,068 | B1 | 4/2002 | Foster | WO | WO9834365 | 8/1998 |
| 6,378,072 | B1 | 4/2002 | Collins et al. | WO | WO9844402 | 10/1998 |
| 6,389,537 | B1 | 5/2002 | Davis et al. | WO | WO9905600 | 2/1999 |
| 6,397,242 | B1* | 5/2002 | Devine et al. ............... 718/1 | WO | WO9918511 | 4/1999 |
| 6,397,379 | B1 | 5/2002 | Yates, Jr. et al. | WO | WO9957863 | 11/1999 |
| 6,412,035 | B1 | 6/2002 | Webber | WO | WO9965579 | 12/1999 |
| 6,421,702 | B1 | 7/2002 | Gulick | WO | WO0021238 | 4/2000 |
| 6,435,416 | B1 | 8/2002 | Slassi | WO | WO0062232 | 10/2000 |
| 6,445,797 | B1 | 9/2002 | McGough et al. | WO | WO0127723 | 4/2001 |
| 6,463,535 | B1 | 10/2002 | Drews et al. | WO | WO0127821 | 4/2001 |
| 6,463,537 | B1 | 10/2002 | Tello | WO | WO0163994 | 8/2001 |
| 6,499,123 | B1 | 12/2002 | McFarland et al. | WO | WO0175565 | 10/2001 |
| 6,505,279 | B1 | 1/2003 | Phillips et al. | WO | WO1075595 | 10/2001 |
| 6,507,904 | B1 | 1/2003 | Ellison et al. | WO | WO0201794 | 1/2002 |
| 6,529,909 | B1 | 3/2003 | Bowman-Amuah | WO | WO9909482 | 1/2002 |
| 6,535,988 | B1 | 3/2003 | Poisner | WO | WO0217555 | 2/2002 |
| 6,557,104 | B2 | 4/2003 | Vu et al. | WO | WO02060121 | 8/2002 |
| 6,560,627 | B1 | 5/2003 | McDonald et al. | WO | WO0175564 | 10/2002 |
| 6,609,199 | B1 | 8/2003 | DeTreville | WO | WO02086684 | 10/2002 |
| 6,615,278 | B1 | 9/2003 | Curtis | WO | WO03058412 | 7/2003 |
| 6,633,963 | B1 | 10/2003 | Ellison et al. | | | |
| 6,633,981 | B1 | 10/2003 | Davis | | | |
| 6,651,171 | B1 | 11/2003 | England et al. | | | |
| 6,678,825 | B1 | 1/2004 | Ellison et al. | | | |
| 6,684,326 | B1 | 1/2004 | Cromer et al. | | | |
| 6,961,806 | B1* | 11/2005 | Agesen et al. ............... 711/6 | | | |
| 7,111,200 | B2* | 9/2006 | Armstrong et al. ........... 714/34 | | | |
| 2001/0021969 | A1 | 9/2001 | Burger et al. | | | |
| 2001/0027511 | A1 | 10/2001 | Wakabayashi et al. | | | |
| 2001/0027527 | A1 | 10/2001 | Khidekel et al. | | | |
| 2001/0037450 | A1 | 11/2001 | Metlitski et al. | | | |
| 2002/0007456 | A1 | 1/2002 | Peinado et al. | | | |
| 2002/0023032 | A1 | 2/2002 | Pearson et al. | | | |
| 2002/0147916 | A1 | 10/2002 | Strongin et al. | | | |
| 2002/0166061 | A1 | 11/2002 | Falik et al. | | | |
| 2002/0169717 | A1 | 11/2002 | Challener | | | |
| 2003/0018892 | A1 | 1/2003 | Tello | | | |
| 2003/0074548 | A1 | 4/2003 | Cromer et al. | | | |
| 2003/0115453 | A1 | 6/2003 | Grawrock | | | |
| 2003/0126442 | A1 | 7/2003 | Glew et al. | | | |
| 2003/0126453 | A1 | 7/2003 | Glew et al. | | | |
| 2003/0159056 | A1 | 8/2003 | Cromer et al. | | | |
| 2003/0188179 | A1 | 10/2003 | Challener et al. | | | |
| 2003/0196085 | A1 | 10/2003 | Lampson et al. | | | |
| 2004/0003324 | A1 | 1/2004 | Uhlig et al. | | | |
| 2004/0117539 | A1 | 6/2004 | Bennett et al. | | | |
| 2004/0123288 | A1 | 6/2004 | Bennette et al. | | | |
| 2005/0076186 | A1* | 4/2005 | Traut ............................ 712/1 | | | |
| 2005/0081199 | A1* | 4/2005 | Traut ............................ 718/1 | | | |
| 2005/0091652 | A1* | 4/2005 | Ross et al. .................... 718/1 | | | |
| 2005/0223221 | A1* | 10/2005 | Proudler et al. ............. 713/164 | | | |
| 2005/0283586 | A1 | 12/2005 | Mondal et al. | | | |

FOREIGN PATENT DOCUMENTS

| | | |
|---|---|---|
| EP | 0473913 | 3/1992 |
| EP | 0600112 | 6/1994 |
| EP | 0602867 | 6/1994 |
| EP | 0892521 | 1/1999 |
| EP | 0930567 | 7/1999 |
| EP | 0961193 | 12/1999 |
| EP | 0965902 | 12/1999 |

OTHER PUBLICATIONS

PCT Search Report PCT/US2005/01056, dated Aug. 22, 2006, 6 pages.

Berg, Cliff , "How Do I Create a Signed Applet?", *Dr. Dobb's Journal*, (Aug. 1997),1-9.

Brands, Stefan , "Restrictive Blinding of Secret-Key Certificates", *Springer-Verlag* XP002201306, (1995),Chapter 3.

Chien, Andrew A., et al., "Safe and Protected Execution for the Morph/AMRM Reconfigurable Processor", *7th Annual IEEE Symposium, FCCM '99 Proceedings*, XP010359180, ISBN 0-7695-0375-6, Los Alamitos, CA, (Apr. 21, 1999),209-221.

Compaq Computer Corporation, "Trusted Computing Platform Alliance (TCPA) Main Specification Version 1.1a", XP002272822, (Jan. 25, 2001),1-321.

Coulouris, George , et al., "Distributed Systems, Concepts and Designs", *2nd Edition*, (1994),422-424.

Crawford, John , "Architecture of the Intel 80386", *Proceedings of the IEEE International Conference on Computer Design: VLSI in Computers and Processors (ICCD '86)*, (Oct. 6, 1986), 155-160.

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).

Fabry, R.S. , "Capability-Based Addressing", Fabry, R.S., "Capability-Based Addressing," *Communications of the ACM*, vol. 17, No. 7, (Jul. 1974),403-412.

Frieder, Gideon , "The Architecture And Operational Characteristics of the VMX Host Machine", *The Architecture And Operational Characteristics of the VMX Host Machine, IEEE*, (1982),9-16.

Goldberg, Robert P., "Survey of Virtual Machine Research", *COMPUTER Magazine*, (Jun. 1974),34-35.

Gong, Li , et al., "Going Beyond the Sandbox: An Overview of the New Security Architecture in the Java Development Kit 1.2", *Proceedings of the USENIX Symposium on Internet Technologies and Systems*, Monterey, CA,(Dec. 1997).

Gum, P. H., "System/370 Extended Architecture: Facilities for Virtual Machines", *IBM J. Research Development*, vol. 27, No. 6, (Nov. 1983),530-544.

Hall, Judith S., et al., "Virtualizing the VAX Architecture," ACM SIGARCH Computer Architecture News, Proceedings of the 18th annual international symposium on Computer architecture, vol. 19, Issue No. 3, Apr. 1991, 10 pages.

Heinrich, Joe, "MIPS R4000 Microprocessor User's Manual, Second Edition", *Chapter 4 "Memory Management"*, (Jun. 11, 1993),61-97.

HP Mobile Security Overview, "HP Mobile Security Overview", (Sep. 2002),1-10.

IBM, "Information Display Technique for a Terminate Stay Resident Program IBM Technical Disclosure Bulletin", *TDB-ACC-No. NA9112156*, vol. 34, Issue 7A, (Dec. 1, 1991),156-158.

IBM Corporation, "IBM ThinkPad T30 Notebooks", *IBM Product Specification*, located at www-1.ibm.com/services/files/cisco_t30_spec_sheet_070202.pdf, last visited Jun. 23, 2004,(Jul. 2, 2002), 1-6.

INTEL, "IA-32 Intel Architecture Software Developer's Manual", vol. 3: *System Programming Guide*, Intel Corporation—2003,13-1 through 13-24.

INTEL, "Intel386 DX Microprocessor 32-Bit CHMOS Microprocessor With Integrated Memory Management", (1995),5-56.

Intel Corporation, "IA-64 System Abstraction Layer Specification", *Intel Product Specification*, Order No. 245359-001, (Jan. 2000),1-112.

Intel Corporation, "Intel 82802AB/82802AC Firmware Hub (FWH)", *Intel Product Datasheet*, Document No. 290658-004,(Nov. 2000),1-6, 17-28.

Intel Corporation, "Intel IA-64 Architecture Software Developer's Manual", vol. 2: IA-64 *System Architecture*, Order No. 245318-001, (Jan. 2000),i,ii, 5.1-5.3, 11.1-11.8, 11.23-11.26.

Karger, Paul A., et al., "A VMM Security Kernel for the VAX Architecture", *Proceedings of the Symposium on Research in Security and Privacy*, XP010020182, ISBN 0-8186-2060-9, Boxborough, MA, (May 7, 1990),2-19.

Kashiwagi, Kazuhiko, et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8,(1996).

Lawton, Kevin, et al., "Running Multiple Operating Systems Concurrently on an IA32 PC Using Virtualization Techniques", http://www.plex86.org/research/paper.txt, (Nov. 29, 1999),1-31.

Luke, Jahn, et al., "Replacement Strategy for Aging Avionics Computers", *IEEE AES Systems Magazine*, XP002190614,(Mar. 1999).

Menezes, Alfred J., et al., "Handbook of Applied Cryptography", *CRC Press Series on Discrete Mathematices and its Applications*, Boca Raton, FL, XP002165287, ISBN 0849385237,(Oct. 1996),403-405, 506-515, 570.

Menezes, Alfred J., et al., "Handbook of Applied Cryptography", *CRC Press LLC*, USA XP002201307, (1997),475.

MOTOROLA, "M68040 User's Manual", (1993),1-1 to 8-32.

Nanba, S., et al., "VM/4: ACOS-4 Virtual Machine Architecture", *VM/4: ACOS-4 Virtual Machine Architecture, IEEE*, (1985),171-178.

Richt, Stefan, et al., "In-Circuit-Emulator Wird Echtzeittauglich", *Elektronic, Franzis Verlag GMBH*, Munchen, DE, vol. 40, No. 16, XP000259620,(100-103),8-6-1991.

Robin, John S., et al., "Analysis of the Pentium's Ability to Support a Secure Virtual Machine Monitor", *Proceedings of the 9th USENIX Security Symposium*, XP002247347, Denver, Colorado, (Aug. 14, 2000),1-17.

Rosenblum, M., "Virtual Platform: A Virtual Machine Monitor for Commodity PC", *Proceedings of the 11th Hotchips Conference*, (Aug. 17, 1999),185-196.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Saez, Sergio, et al., "A Hardware Scheduler for Complex Real-Time Systems", *Proceedings of the IEEE International Symposium on Industrial Electronics*, XP002190615,(Jul. 1999),43-48.

Schneier, Bruce, "Applied Cryptography: Protocols, Algorithm, and Source Code in C", *Wiley, John & Sons, Inc.*, XP002939871; ISBN 0471117099,(Oct. 1995),47-52.

Schneier, Bruce, "Applied Cryptography: Protocols, Algorithm, and Source Code in C", *Wiley, John & Sons, Inc.*, XP002138607; ISBN 0471117099,(Oct. 1995),56-65.

Schneier, Bruce, "Applied Cryptography: Protocols, Algorithms, and Source Code C", *Wiley, John & Sons, Inc.*, XP0021111449; ISBN 0471117099,(Oct. 1995),169-187.

Schneier, Bruce, "Applied Cryptography: Protocols, Algorithms, and Source Code in C", *2nd Edition; Wiley, John & Sons, Inc.*, XP002251738; ISBN 0471128457,(Nov. 1995),28-33; 176-177; 216-217; 461-473; 518-522.

Sherwood, Timothy, et al., "Patchable Instruction ROM Architecture", *Department of Computer Science and Engineering*, University of California, San Diego, La Jolla, CA, (Nov. 2001).

IBM Systems/370 Extended Architecture, Interpretive Execution, IBM Publication No. 2122-7095-1, 2$^{nd}$ Edition, Sep. 1985, pp. 1-24.

\* cited by examiner

PROVIDING SUPPORT FOR SINGLE STEPPING A VIRTUAL MACHINE IN A VIRTUAL MACHINE ENVIRONMENT

FIELD

Embodiments of the invention relate generally to virtual machines, and more specifically to providing support for single stepping a virtual machine in a virtual machine environment.

BACKGROUND OF THE INVENTION

A single stepping technique is commonly used by debuggers in a conventional operating system (OS) environment. In particular, the single stepping technique is used to advance an application one instruction at a time, thus allowing the debugger to position the application at a particular point in the source code. Various mechanisms have been used to enable single stepping. For example, in the instruction set architecture (ISA) of the Intel® Pentium® 4 (referred to herein as the IA-32 ISA), a trap flag (TF) bit in the EFLAGS register is designated to allow a debugger to single step an application. When the TF bit is set to 1, a debug exception is generated following the completion of the next instruction. The debugger sets the TF bit after taking ownership of the debug exception (e.g., by creating a handler for the exception and assuring that the handler will be called in the event of a debug exception). However, the debug exception is generated only if the next instruction completes successfully. If the execution of the next instruction causes a fault (e.g., a page fault), the debug exception is not generated. Rather, the exception is vectored, saving the values of EFLAGS register bits and clearing the TF bit. Upon completion of the handler, the saved value of the TF bit is restored, and the instruction is re-executed. If no faults occur during the re-execution, the debug exception is generated.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EMBODIMENTS

Figure 1:
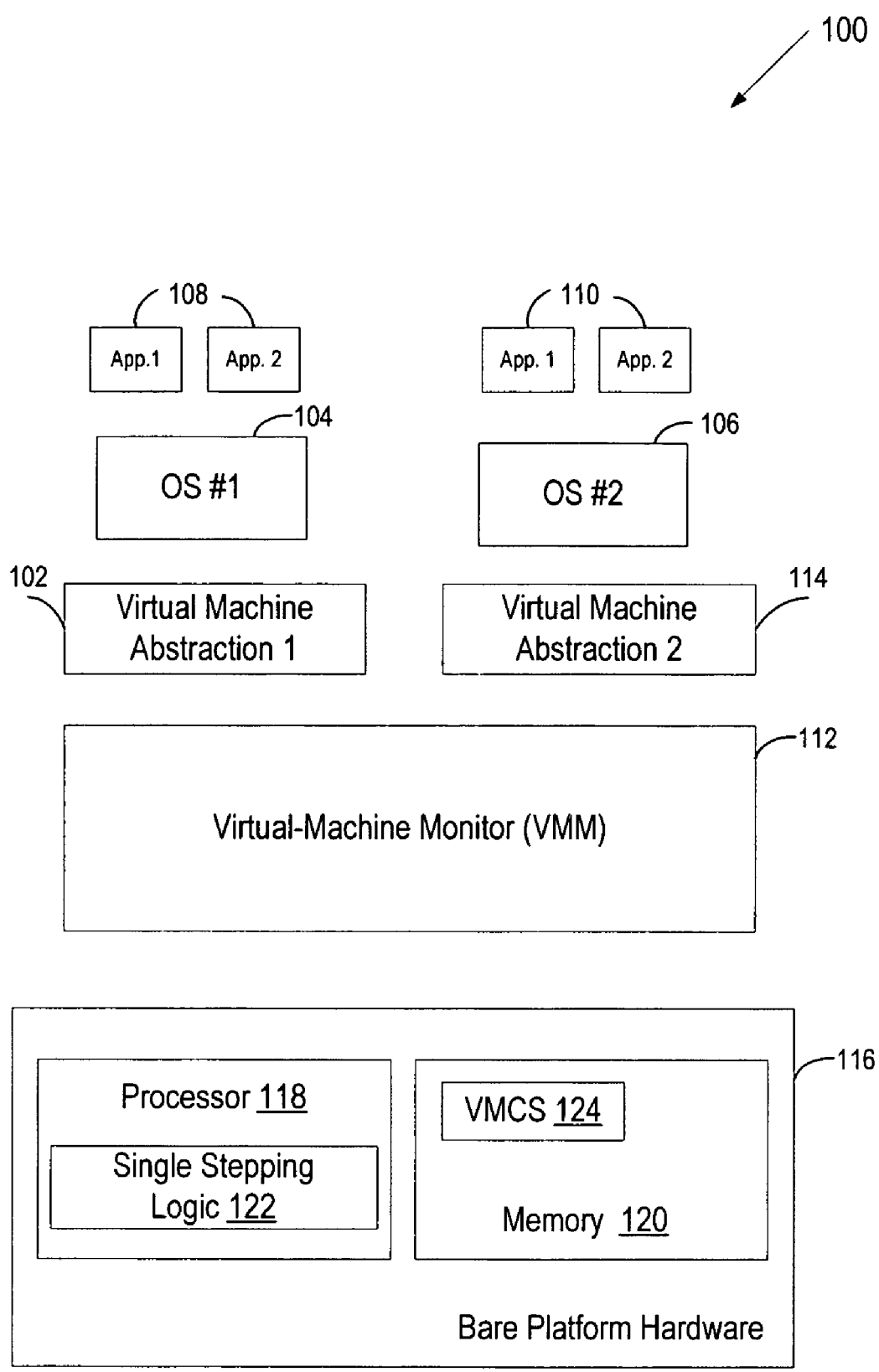
FIG. 1 illustrates one embodiment of a virtual-machine environment, in which the present invention may operate.

A method and apparatus for providing support for single stepping a virtual machine in a virtual machine environment is described. In the following description, for purposes of explanation, numerous specific details are set forth in order to provide a thorough understanding of the present invention. It will be apparent, however, to one skilled in the art that the present invention can be practiced without these specific details.

Some portions of the detailed descriptions that follow are presented in terms of algorithms and symbolic representations of operations on data bits within a computer system's registers or memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

Although the below examples may describe single stepping of a virtual machine in the context of execution units and logic circuits, other embodiments of the present invention can be accomplished by way of software. For example, in some embodiments, the present invention may be provided as a computer program product or software which may include a machine or computer-readable medium having stored thereon instructions which may be used to program a computer (or other electronic devices) to perform a process according to the present invention. In other embodiments, steps of the present invention might be performed by specific hardware components that contain hardwired logic for performing the steps, or by any combination of programmed computer components and custom hardware components.

Thus, a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, electrical, optical, acoustical or other forms of propagated signals (e.g., carrier waves, infrared signals, digital signals, etc.) or the like.

Further, a design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) embodying techniques of the present invention.

FIG. 1 illustrates one embodiment of a virtual-machine environment 100, in which the present invention may operate. In this embodiment, bare platform hardware 116 comprises a computing platform, which may be capable, for example, of executing a standard operating system (OS) or a virtual-machine monitor (VMM), such as a VMM 112.

The VMM 112, though typically implemented in software, may emulate and export a bare machine interface to higher level software. Such higher level software may comprise a standard or real-time OS, may be a highly stripped down operating environment with limited operating system functionality, may not include traditional OS facilities, etc. Alternatively, for example, the VMM 112 may be run within, or on top of, another VMM. VMMs may be implemented, for example, in hardware, software, firmware or by a combination of various techniques.

The platform hardware 116 can be of a personal computer (PC), mainframe, handheld device, portable computer, set-top box, or any other computing system. The platform hardware 116 includes a processor 118 and memory 120.

Processor 118 can be any type of processor capable of executing software, such as a microprocessor, digital signal processor, microcontroller, or the like. The processor 118 may include microcode, programmable logic or hardcoded logic for performing the execution of method embodiments of the present invention. Although FIG. 1 shows only one such processor 118, there may be one or more processors in the system.

Memory 120 can be a hard disk, a floppy disk, random access memory (RAM), read only memory (ROM), flash memory, any combination of the above devices, or any other type of machine medium readable by processor 118. Memory 120 may store instructions and/or data for performing the execution of method embodiments of the present invention.

The VMM 112 presents to other software (i.e., "guest" software) the abstraction of one or more virtual machines (VMs), which may provide the same or different abstractions to the various guests. FIG. 1 shows two VMs, 102 and 114. The guest software running on each VM may include a guest OS such as a guest OS 104 or 106 and various guest software applications 108 and 110. Each of the guest OSs 104 and 106 expect to access physical resources (e.g., processor registers, memory and I/O devices) within the VMs 102 and 114 on which the guest OS 104 or 106 is running and to perform other functions. For example, the guest OS expects to have access to all registers, caches, structures, I/O devices, memory and the like, according to the architecture of the processor and platform presented in the VM. The resources that can be accessed by the guest software may either be classified as "privileged" or "non-privileged." For privileged resources, the VMM 112 facilitates functionality desired by guest software while retaining ultimate control over these privileged resources. Non-privileged resources do not need to be controlled by the VMM 112 and can be accessed by guest software.

Further, each guest OS expects to handle various fault events such as exceptions (e.g., page faults, general protection faults, etc.), interrupts (e.g., hardware interrupts, software interrupts), and platform events (e.g., initialization (INIT) and system management interrupts (SMIs)). Some of these fault events are "privileged" because they must be handled by the VMM 112 to ensure proper operation of VMs 102 and 114 and for protection from and among guest software.

When a privileged fault event occurs or guest software attempts to access a privileged resource, control may be transferred to the VMM 112. The transfer of control from guest software to the VMM 112 is referred to herein as a VM exit. After facilitating the resource access or handling the event appropriately, the VMM 112 may return control to guest software. The transfer of control from the VMM 112 to guest software is referred to as a VM entry.

In one embodiment, the processor 118 controls the operation of the VMs 102 and 114 in accordance with data stored in a virtual machine control structure (VMCS) 124. The VMCS 124 is a structure that may contain state of guest software, state of the VMM 112, execution control information indicating how the VMM 112 wishes to control operation of guest software, information controlling transitions between the VMM 112 and a VM, etc. The processor 118 reads information from the VMCS 124 to determine the execution environment of the VM and to constrain its behavior. In one embodiment, the VMCS is stored in memory 120. In some embodiments, multiple VMCS structures are used to support multiple VMs.

In one embodiment, the processor 118 includes single stepping logic 122 that receives a request of the VMM 112 to transfer control to the VM 102 or 114 (a request for a VM entry) and determines whether the VMM 122 has requested to single step the relevant VM. The single stepping functionality may have various uses in the virtual-machine environment 100. For example, the VMM 112 may request the single stepping functionality to debug system (i.e., privileged) or application code running in the VM 102 or 114. In another example, the VMM 112 may request the single stepping functionality to achieve virtualization of a particular device or platform during the operation of the VM 102 or 114 (e.g., a memory-mapped I/O device for which the VMM 112 wishes to allow the VM's read operations but not write operations). In yet another example, the VMM 112 may request the single stepping functionality to trace the execution of the VM 102 or 114 (e.g., to maintain the history of VM operation when testing the design of a new system).

The single stepping logic 122 determines whether the VMM 122 has requested the single stepping functionality based on a current value of a single stepping indicator. In one embodiment, the single stepping indicator is stored in the VMCS 124. Alternatively, the single stepping indicator may reside in the processor 118, a combination of the memory 120 and the processor 118, or in any other storage location or locations.

In one embodiment, the VMM 112 sets the value of the single stepping indicator before requesting a transfer of control to the VM 102 or 114. Alternatively, each of the VMs 102 and 114 is associated with a different single stepping indicator that is set to a predefined value or changed during the life of the VM.

If the single stepping logic 122 determines, upon receiving the request of the VMM 112 for a VM entry, that the single stepping indicator is set to a single stepping value (e.g., 1), the single stepping logic 122 transitions control to the VM, executes the first VM instruction, and if the execution of the first VM instruction completes successfully, transfers control back to the VMM 112 (i.e., a VM exit is generated). In one embodiment, the single stepping logic 122 also notifies the VMM 112 (e.g., using a designated reason code) that the VM exit is caused by the current value of the single stepping indicator.

If the execution of the first VM instruction is unsuccessful (i.e., it causes a fault), the single stepping logic 122 determines whether the resulting fault is associated with a VM exit (e.g., by examining relevant execution control information in the VMCS 124 to determine whether it indicates that the fault requires a VM exit). If so, the single stepping logic 122 transfers control to the VMM 112 and, in one embodiment, notifies the VMM 112 that this VM exit is caused by the fault. If the fault does not require a VM exit, the single stepping logic 122 delivers the fault to the VM. In one embodiment, delivering of the fault involves searching a redirection structure for an entry associated with the fault being delivered, extracting from this entry a descriptor of the location of a routine designated to handle this fault, and jumping to the beginning of the routine using the descriptor. Routines designated to handle corresponding interrupts, exceptions or any other faults are referred to herein as fault handlers.

During the delivery of a fault, the processor 118 may perform one or more address translations, converting an address from a virtual to physical form. For example, the address of the interrupt table or the address of the associated handler may be a virtual address. The processor may also need to perform various checks during the delivery of a fault. For example, the processor may perform consistency checks such as validation of segmentation registers and access addresses (resulting in limit violation faults, segment-not-present faults, stack faults, etc.), permission level checks that may result in protection faults (e.g., general-protection faults), etc.

Address translations and checking during fault vectoring may result in a variety of faults, such as page faults, general protection faults, etc. Some faults occurring during the delivery of a current fault may cause a VM exit. For example, if the VMM 112 requires VM exists on page faults to protect and virtualize the physical memory, then a page fault occurring during the delivery of a current fault to the VM will result in a VM exit.

In one embodiment, the single stepping logic 122 addresses the above possible occurrences of additional faults by checking whether the delivery of the current fault was successful. If the delivery of the current fault completes successfully, the single stepping logic 122 generates a VM exit prior to executing any instructions of the fault handler, and notifies the VMM 112 that the VM exit is caused by the current value of the single stepping indicator. If the single stepping logic 122 determines that the delivery was unsuccessful, it repeats the above processing for the new fault.

For certain instructions, the successful completion of an instruction includes the vectoring of a fault, exception or interrupt. For example, in the IA-32 ISA, a software interrupt instruction (i.e., INTn, INTO, INT3) vectors a software interrupt by generating a call to an interrupt or exception handler. When such an instruction takes place, the VM exit due to the single stepping mechanism occurs prior to execution of the first instruction of the interrupt or exception handler in the VM (assuming there are no nested exceptions encountered during delivery of the software interrupt and no VM exits are caused by the faults or exceptions).

Note that the VM may be utilizing debug or single stepping mechanism independent of the single stepping mechanism discussed herein. For example, in the IA-32 ISA, the VM may have the TF bit in the EFLAGS register set to one in order to generate single stepping traps, or it may be utilizing the debug registers to generate debug breakpoints. If the first VM instruction causes such a breakpoint or trap, the VM exit due to the single stepping mechanism occurs before the vectoring of the breakpoint or trap. Information regarding the pending breakpoint or trap may, in an embodiment, be stored in the VMCS for use by the VMM to properly emulate the mechanism used by the VM.

Figure 2:
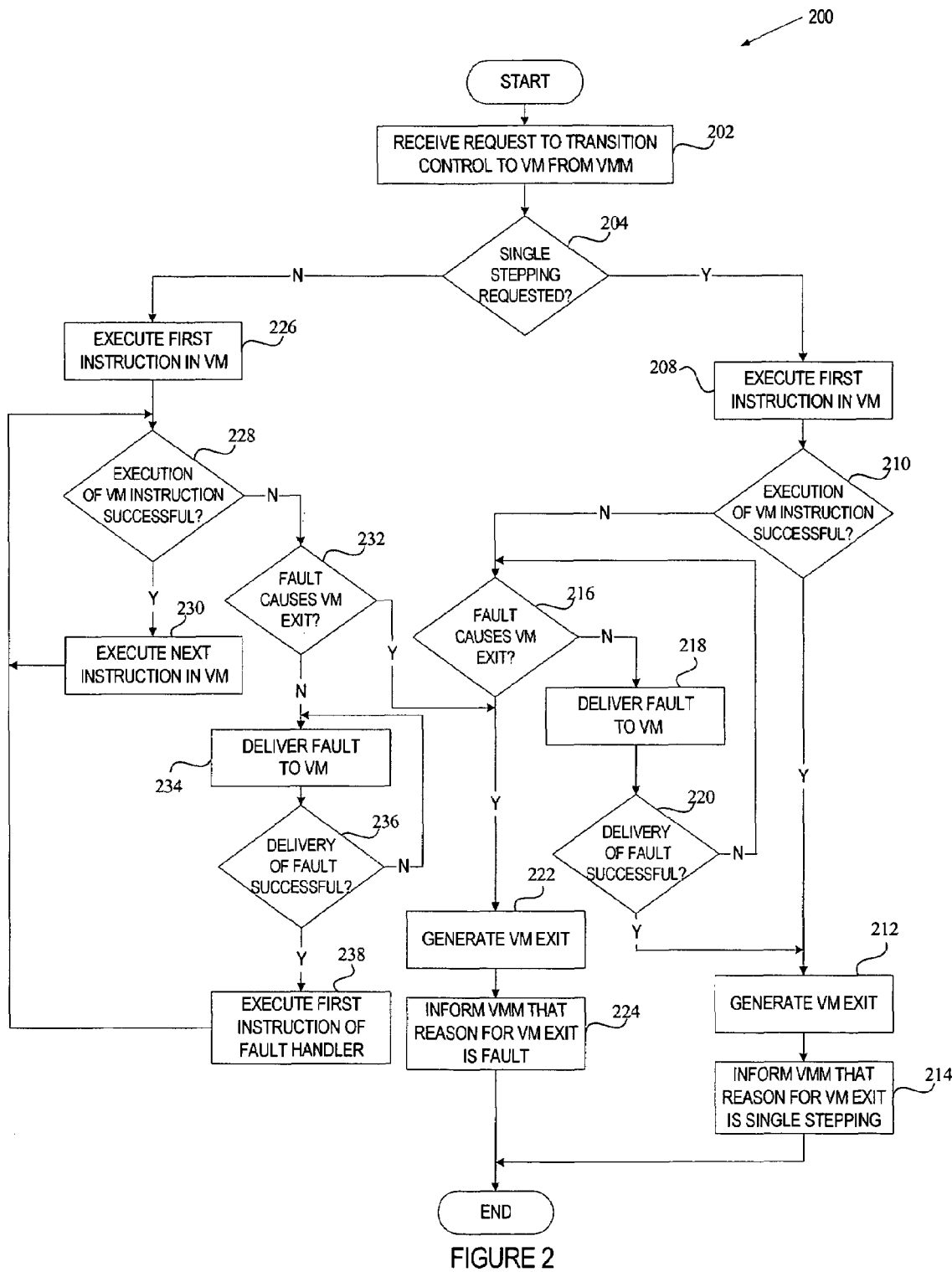
FIG. 2 is a flow diagram of one embodiment of a process for providing support for single stepping a virtual machine in a virtual machine environment.

FIG. 2 is a flow diagram of one embodiment of a process 200 for providing support for single stepping a VM in a VM environment. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 200 is performed by single stepping logic 122 of FIG. 1.

Referring to FIG. 2, process 200 begins with processing logic receiving a request to transition control to a VM from a VMM (processing block 202). In one embodiment, the request to transition control is received via a VM entry instruction executed by the VMM.

At decision box 204, processing logic determines whether the VMM has requested single stepping of the VM that is to be invoked. In one embodiment, processing logic determines whether the VMM has requested single stepping of the VM by reading the current value of a single stepping indicator maintained by the VMM. The single stepping indicator may reside in the VMCS or any other data structure accessible to the VMM and processing logic 200. In one embodiment, when the VMM wants to single step a VM, the VMM sets the single stepping indicator to a single stepping value (e.g., 1) and then generates a request to transfer control to this VM. In one embodiment, if the VMM sets the single stepping indicator to the single stepping value, it also sets execution control indicators to cause a VM exit on each fault which may occur during the execution of the VM. Alternatively, the setting of the single stepping indicator is independent of some or all execution control indicators.

In one embodiment, the single stepping indicator is reset to a non-single stepping value (e.g., 0) at each VM exit. In another embodiment, the VMM resets the single stepping indicator to the non-single stepping value prior to requesting the transfer of control to a VM if no single stepping of the VM is needed.

As discussed above, the VMM may request single stepping of a VM when, for example, debugging system or application code running in the VM, virtualizing a device or platform during the operation of the VM, tracing the execution of the VM, etc.

If processing logic determines that single stepping of the VM is needed, processing logic executes a first instruction in the VM (processing block 208) and determines whether the execution of the first VM instruction completes successfully (decision box 210). If so, processing logic generates a VM exit (processing block 212) and informs the VMM that the reason for the VM exit is single stepping (processing block 214). In one embodiment, processing logic informs the VMM about this reason by generating a designated reason code. In one embodiment, the reason code is stored in the VMCS.

If the execution of the first VM instruction is unsuccessful, processing logic determines whether the resulting fault is to cause a VM exit (decision box 216). This determination may be made by examining relevant execution control information (e.g., stored in the VMCS 124). If the resulting fault is to cause a VM exit, processing logic generates a VM exit (processing block 222) and informs the VMM that the reason for the VM exit is the fault (processing block 224). If the resulting fault does not cause a VM exit, processing logic delivers the fault to the VM (processing block 218) and determines whether the delivery of the fault completes successfully (decision box 220). If the delivery of the fault completes successfully, processing logic generates a VM exit (processing block 212) prior to executing any instructions of a corresponding fault handler and informs the VMM that the reason for the VM exit is single stepping (processing block 214).

If the delivery of the fault is unsuccessful, processing logic returns to decision box 216 to process the resulting new fault.

If processing logic determines at decision box 204 that single stepping of the VM has not been requested, processing logic executes a first instruction in the VM (processing block 226) and determines whether the execution of the first VM instruction completes successfully (decision box 228). If so, processing logic executes the next instruction in the VM (processing block 230) and returns to decision box 228. Otherwise, if the execution of the first VM instruction is unsuccessful, processing logic determines whether the resulting fault is to cause a VM exit (decision box 232). If so, processing logic generates a VM exit (processing block 222) and informs the VMM that the reason for the VM exit is the fault (processing block 224). If not, processing logic delivers the fault to the VM (processing block 234) and determines whether the delivery of the fault completes successfully (decision box 236). If the delivery of the fault completes successfully, processing logic execute a first instruction of the fault handler and returns to decision box 228. If the deliver of the fault is unsuccessful, processing logic returns to processing block 234 to process the resulting new fault.

In some embodiments, certain events may occur during the operation of a VM invoked in response to a request for a VM entry associated with a single stepping indicator set to a single stepping value. For example, the VMM may require that a fault be delivered to a VM as part of a VM entry, a VM entry may put the processor in a non-active activity state, a first instruction following a VM entry may cause a VM exit, etc. In the instruction set architecture (ISA) of the Intel® Pentium® 4 (referred to herein as the IA-32 ISA), examples of non-active activity state include the Halt, Wait-for-SIPI, shutdown, and MWAIT states. While in these non-active activity states, the processor does not complete any instructions, and instead waits for the occurrence of one or more break events, which may move the processor from the non-active activity state to the normal active state. For example, while in the Halt activity state, the processor waits for the occurrence of unblocked hardware interrupts, system management interrupts (SMIs), system initialization messages (INITs), non-maskable interrupts (NMIs), debug exceptions, machine check exceptions, etc. Exemplary processes handling such events while supporting single stepping of a VM are discussed below in conjunction with FIGS. 3 and 4.

Figure 3:
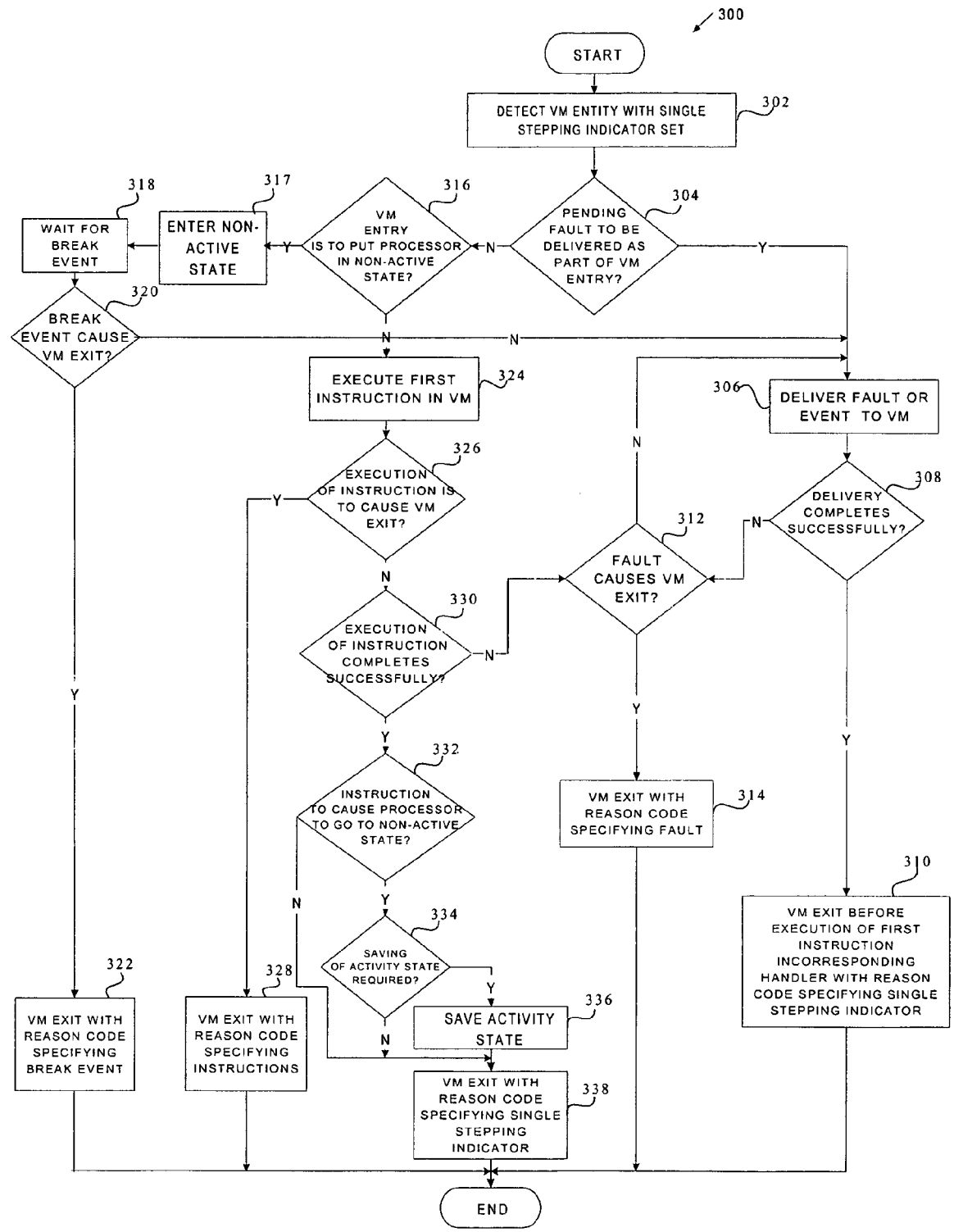
FIG. 3 is a flow diagram of one embodiment of a process for responding to a request for a VM entry with a single stepping indicator set to a single stepping value.

FIG. 3 is a flow diagram of one embodiment of a process 300 for responding to a request for a VM entry with a single stepping indicator set to a single stepping value. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 300 is performed by single stepping logic 122 of FIG. 1.

Referring to FIG. 3, process 300 begins with processing logic detecting a VM entry with a single stepping indicator set to a single stepping value (processing block 302). Next, at decision box 304, processing logic determines whether the VMM has requested a delivery of a pending fault to the VM as part of the VM entry (i.e., a vectored fault is to be delivered to the VM). If so, processing logic delivers the pending fault to the VM (processing block 306). Delivery of a fault may involve searching a redirection structure for an entry associated with the fault being delivered, extracting from this entry a descriptor of the location of a corresponding fault handler, and jumping to the beginning of the fault handler using the descriptor. During the delivery of a fault, several operations may need to be performed (e.g., address translations, validation of segmentation registers and access addresses, permission level checks, etc.) that may result in new faults (e.g., page faults, general-protection faults, etc.). At decision box 308, processing logic determines whether the delivery of the pending fault completes successfully. If so (i.e., no new faults occur), processing logic generates a VM exit with the reason code specifying the single stepping indicator, prior to executing any instructions in the corresponding handler (processing block 310).

If the delivery of the pending fault is unsuccessful, processing logic determines whether a resulting new fault is to cause a VM exit (decision box 312). If so, processing logic generates a VM exit with the reason code specifying the new fault (processing block 314). Otherwise, if the new fault is not to cause a VM exit, processing logic returns to processing block 306 to process the new fault.

If processing logic determines at decision box 304 that the VMM has not requested delivery of a pending fault as part of the VM entry, processing logic further determines whether the VM entry is to put the processor in a non-active activity state (decision box 316). If so, processing logic enters the non-active activity state (e.g., the Halt state) (processing block 317), waits for a break event that can put the processor from the non-active activity state to a normal (i.e., active) activity state (processing block 318), and then determines whether the break event is to cause a VM exit (e.g., by examining relevant execution control information in the VMCS 124) (decision box 320). If this determination is positive, processing logic generates a VM exit with the reason code specifying the break event (processing block 322). In an embodiment, if a specifier of the activity state of the VM is required to be saved as part of the VM exit (as determined, for example, by examining a save activity state indicator in the execution control information in the VMCS), the specifier of the activity state prior to the occurrence of the break event (i.e., the non-active activity state) is saved. Otherwise, if the break event is not to cause a VM exit, processing logic proceeds to processing block 306, attempting to deliver the break event to the VM. In one embodiment, the attempt to deliver the break event to the VM has the effect of moving the VM from the non-active activity state to the normal (i.e., active) activity state; if a specifier of the activity state of the VM is subsequently saved, it will indicate the normal (i.e., active) activity state.

If processing logic determines at decision box 316 that the VM entry does not put the processor in a non-active activity state, processing logic executes the first instruction in the VM (processing block 324) and determines whether the execution of the first instruction is to cause a VM exit (decision box 326). If so, processing logic generates a VM exit with the reason code identifying the instruction (processing block 328). If not, processing logic determines whether execution of the first instruction completes successfully (decision box 330).

If the execution of the first instruction is unsuccessful, processing logic proceeds to decision box 312 to process a resulting new fault. If the execution of the first instruction completes successfully, processing logic further determines whether the instruction causes the processor to go into a non-active activity state (decision box 332). For example, in the IA-32 ISA, the HLT instruction causes the processor to enter the Halt state, which is a non-active activity state. If the executed instruction does enter a non-active activity state, processing logic further determines whether a specifier of the activity state is required to be saved (e.g., by examining a save activity state indicator in the execution control information in the VMCS) (decision box 334). If the specifier of activity state is required to be saved, processing logic saves the indicator of the activity state (e.g., into the VMCS) (processing block 336) and generates a VM exit with the reason code specifying the single stepping indicator (processing block 338). If the instruction does not cause the processor to go into a non-active activity state, or it does causes the processor to go into a non-active activity state but the specifier of the activity state does not need to be saved, processing logic proceeds directly to processing block 338.

Figure 4:
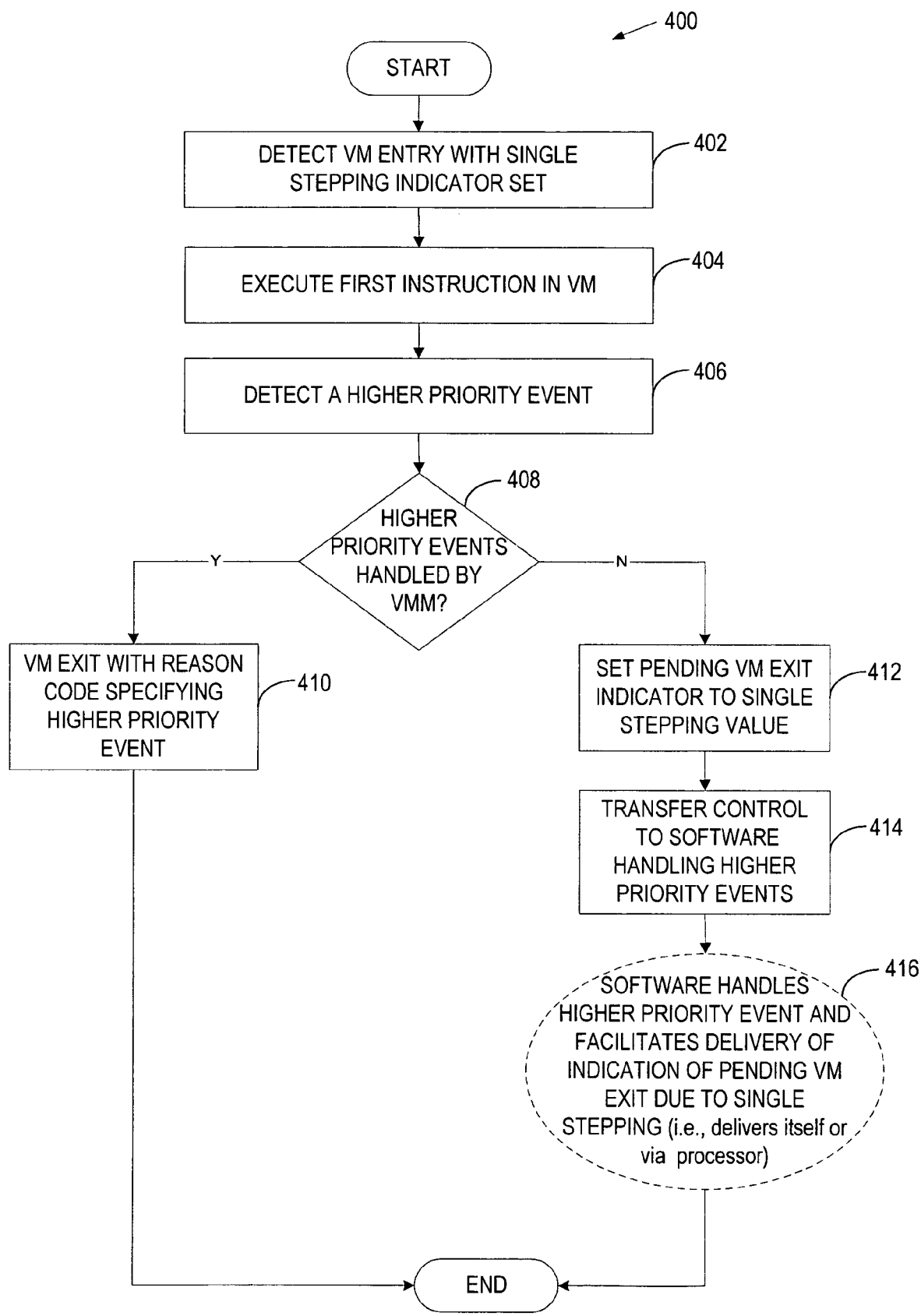
FIG. 4 is a flow diagram of one embodiment of a process for handling events having a higher priority than single stepping.

In some embodiments, single stepping may have a priority that is below the priority of some other events (e.g., platform events such as, for example, INIT and SMI). FIG. 4 is a flow diagram of one embodiment of a process 400 for handling events having a higher priority than single stepping. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 400 is performed by single stepping logic 122 of FIG. 1.

Referring to FIG. 4, process 400 begins with processing logic detecting a VM entry with a single stepping indicator set to a single stepping value (processing block 402) and executes a first instruction in the VM (processing block 404).

Next, following execution of the first instruction in the VM, processing logic detects an event (e.g., NMI, SMI, etc.) that has a higher priority than single stepping (processing block 406) and determines whether the higher priority event is to be handled by the VMM or some designated software (decision box 408). In one embodiment, the higher priority event is handled by the VMM if the VMM utilizing the single stepping mechanism was capable of setting, prior to the relevant VM entry, an execution control indicator for the higher priority event in such a way as to cause a VM exit. If the VMM utilizing the single stepping mechanism was not capable of setting a corresponding execution control indicator as discussed above (e.g., there is no such an execution control indicator available), the higher priority event may be handled by designated software. For example, the VMM utilizing the single stepping mechanism may set, prior to the relevant VM entry, corresponding execution control bits such that an NMI will cause a VM exit. In another example, the VMM utilizing the single stepping mechanism may not have the capability of updating an execution control indicator associated with SMI prior to the relevant VM entry. Then, SMI may be handled by software designated to manage higher priority events.

If the higher priority event is to be handled by the VMM utilizing the single stepping mechanism, processing logic generates a VM exit with the reason code specifying the higher priority event (processing block 410). Alternatively, if the higher priority event is to be handled by the software designated to manage the higher priority event, processing logic sets a pending VM exit indicator (e.g., in the VMCS) to a single stepping value (processing block 412), and transfers control to the designated software (processing block 414). The designated software then handles the higher priority event and facilitates the delivery of the pending VM exit due to the single stepping mechanism to the VMM (block 416). The pending VM exit indicator may be delivered to the VMM by the designated software itself or by the processor upon completion of the processing of the higher priority event. For example, SMI processing may be handled by managing software separate from the VMM. Upon completion of handling an SMI, the managing software may execute the RSM (return-from-system-management-mode) instruction, and then, upon execution of this instruction, the processor may recognize that there is a pending VM exit due to the single stepping mechanism and deliver it accordingly.

As discussed above, single stepping of a VM by the VMM may have various uses, including, for example, debugging system or application code running in the VM, virtualizing a device or platform during the operation of the VM, tracing the execution of the VM, etc. An exemplary process utilizing single stepping to facilitate virtualization of a device will now be discussed in more detail.

Figure 5:
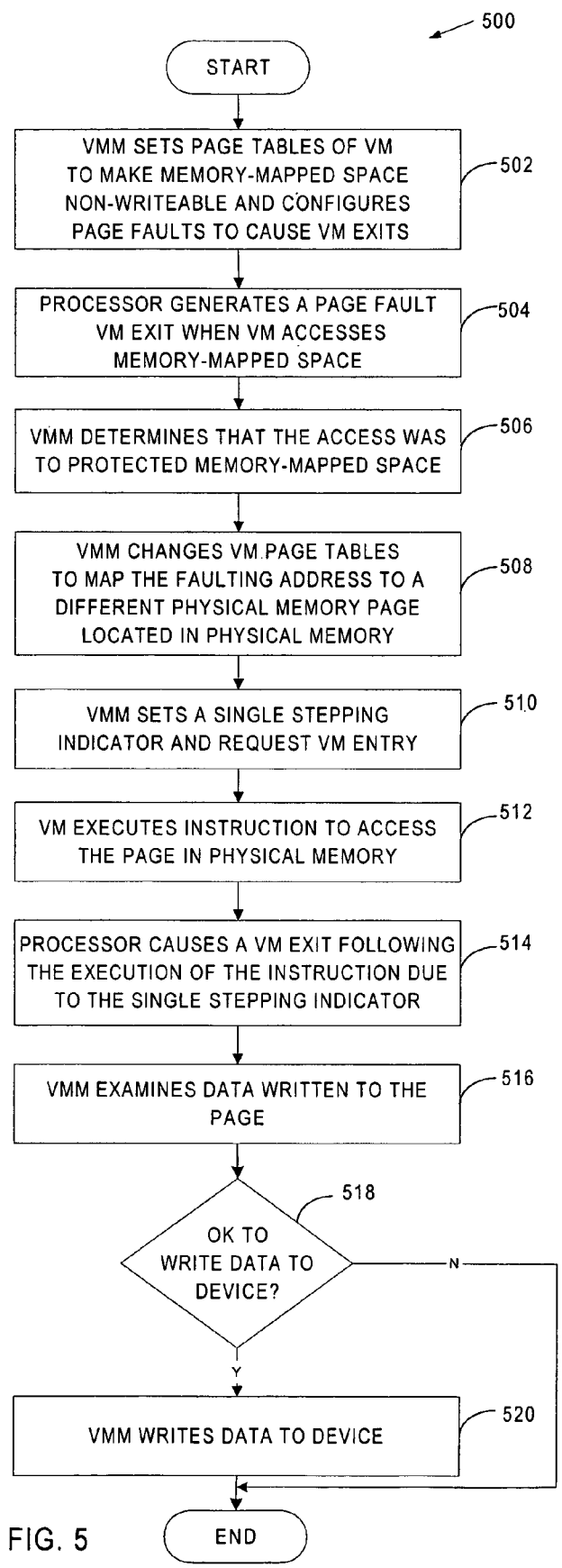
FIG. 5 is a flow diagram of an exemplary process for utilizing single stepping of a VM to facilitate virtualization of a device, according to one embodiment.

FIG. 5 is a flow diagram of an exemplary process 500 for utilizing single stepping of a VM to facilitate virtualization of a device, according to one embodiment. The device may be an input/output (I/O) device that uses a memory-mapped programming model (e.g., an advanced programmable interrupt controller (APIC)), and the VMM may want to prevent a VM from writing data to the memory-mapped I/O device while allowing the VM to read data from the memory-mapped I/O device. Process 500 may be performed by processing logic that may comprise hardware (e.g., circuitry, dedicated logic, programmable logic, microcode, etc.), software (such as that run on a general purpose computer system or a dedicated machine), or a combination of both.

Referring to FIG. 5, process 500 begins at processing block 502 with processing logic in the VMM setting page tables of the VM to make the memory-mapped space of the device non-writable and configuring page faults encountered during the execution of the VM to cause VM exits (e.g., using corresponding execution control information). In one embodiment, setting of the VM page tables is enabled by using a virtual translation lookaside buffer (VTLB) data structure that maintains a separate active guest page table, under control of the VMM, for each VM.

At processing block 504, processing logic in the processor generates a page fault VM exit when the VM accesses the memory-mapped space of the device.

At processing block 506, processing logic in the VMM determines that the VM access was to the protected memory-mapped space (e.g., by examining the faulting address value that falls onto the memory-mapped I/O page).

At processing block 508, processing logic in the VMM changes the VM page tables to map the faulting address to a different physical memory page located in normal physical memory (i.e., not memory mapped I/O space).

At processing block 510, processing logic in the VMM sets a single stepping indicator and requests a VM entry.

At processing block 512, processing logic in the processor executes an instruction in the VM to access the above page chosen by the VMM.

At processing block 514, processing logic in the processor causes a VM exit, following a successful execution of the instruction, due to the single stepping indicator.

Next, processing logic in the VMM examines data written to the page of physical memory configured in processing block 508 (processing block 516) and decides whether the data is to be written to the device (decision box 518). This decision may be based on security (e.g., it may be allowed to write some data to the device but not the other data) or correctness (e.g., the data may need to be changed prior to writing it to the device if required by virtualization).

If the decision made at decision box 518 is positive, processing logic in the VMM writes the data to the device (processing block 520). Alternatively, the VMM may modify the data before writing it to the device to ensure that certain characteristics regarding, for example, security, performance or device virtualization are proper.

Thus, a method and apparatus for providing support for single stepping a virtual machine in a virtual machine environment have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving a request to transition control to a virtual machine (VM) from a virtual machine monitor (VMM);
determining that a single-stepping indicator is set to a single stepping value; and
in response to determining that the single-stepping indicator is set to the single stepping value, automatically performing single stepping of the VM by
transitioning control to the VM, and
if an execution of a first instruction in the VM completes successfully, transitioning control to the VMM following the successful completion of the execution of the first instruction.

2. The method of claim 1 wherein transitioning control to the VMM comprises informing the VMM that control is transitioned to the VMM due to a current value of the single-stepping indicator.

3. The method of claim 1 further comprising:
if the execution of the first instruction in the VM does not complete successfully due to a current fault, determining whether the current fault caused by the execution of the first instruction is associated with a transition of control to the VMM.

4. The method of claim 3 further comprising:
if the current fault is associated with the transition of control to the VMM, transitioning control to the VMM, and informing the VMM that control is transitioned to the VMM due to the current fault.

5. The method of claim 3 further comprising:
if the current fault is not associated with the transition of control to the VMM, delivering the current fault to the VM; and
if the delivery of the current fault completes successfully, transitioning control to the VMM prior to executing any instructions of a corresponding fault handler, and informing the VMM that control is transitioned to the VMM due to a current value of the single-stepping indicator.

6. The method of claim 5 further comprising:
determining that the delivery of the current fault was unsuccessful;
determining whether a new fault is associated with a transition of control to the VMM; and
if the new fault is associated with the transition of control to the VMM, transitioning control to the VMM, and informing the VMM that control is transitioned to the VMM due to the new fault.

7. The method of claim 6 further comprising:
determining that the new fault is not associated with the transition of control to the VMM;
delivering the new fault to the VM; and
if the delivery of the new fault completes successfully, transitioning control to the VMM prior to executing any instructions of a corresponding fault handler, and informing the VMM that control is transitioned to the VMM due to a current value of the single-stepping indicator.

8. The method of claim 1 further comprising:
prior to transitioning control to the VM, determining that the request to transition control to the VM is associated with a vectored fault to be delivered to the VM;
delivering the vectored fault to the VM when transitioning control to the VM; and
if the delivery of the vectored fault completes successfully, transitioning control to the VMM vectored to executing any instructions of a corresponding fault handler, and informing the VMM that control is transitioned to the VMM due to a current value of the single-stepping indicator.

9. The method of claim 8 further comprising:
determining that the delivery of the vectored fault was unsuccessful;

determining whether a new fault is associated with a transition of control to the VMM;

if the new fault is associated with the transition of control to the VMM, transitioning control to the VMM, and informing the VMM that control is transitioned to the VMIVI due to the new fault; and if the new fault is not associated with the transition to the VMM, delivering the new fault to the VM, transitioning control to the VMM prior to executing any instructions of a corresponding fault handler, and informing the VMM that control is transitioned to the VMM due to a current value of the single-stepping indicator.

10. The method of claim 1 further comprising:

prior to transitioning control to the VM, determining that the request to transition control to the VM is associated with a non-active activity state of a processor;

transitioning control to the VM; and refraining from transitioning control to the VMM until after an occurrence of a break event.

11. The method of claim 10 further comprising:

if the break event is associated with a transition of control to the VMM, transitioning control to the VMM, and informing the VMM that control is transitioned to the VMM due to the break event.

12. The method of claim 10 further comprising:

determining that the break event is not associated with a transition of control to the VMM;

delivering the break event to the VM;

if the delivery of the break event completes successfully, transitioning control to the VMM prior to executing any instructions of a corresponding handler, and informing the VMM that control is transitioned to the VMM due to a current value of the single-stepping indicator; if the delivery of the break event was unsuccessful, determining whether a new fault is associated with a transition of control to the VMM;

if the new fault is associated with the transition of control to the VMM, transitioning control to the VMM, and informing the VMM that control is transitioned to the VMM due to the new fault; and if the new fault is not associated with the transition of control to the VMM, transitioning control to the VMM prior to executing any instructions of a corresponding fault handler, and informing the VMM that control is transitioned to the VMM due to a current value of the single-stepping indicator.

13. The method of claim 1 wherein the single stepping indicator is included in a virtual machine control structure (VMCS).

14. The method of claim 1 further comprising:

prior to transitioning control to the VMM, accessing a save activity state indicator, and saving a specifier of an activity state of the VM if the save activity state indicator is set to a save value.

15. The method of claim 1 further comprising:

detecting, following the execution of first instruction, an event having a higher priority than single stepping;

determining whether the higher priority event is to be handled by the VMM;

if the higher priority event is to be handled by the VMM, transitioning control to the VMM, and informing the VMM that control is transitioned to the VMM due to the higher priority event; and if the higher priority event is not to be handled by the VMM, setting a pending VM exit indicator to a single stepping value, and transitioning control to software designated to handle higher priority events.

16. The method of claim 15 wherein the designated software delivers a pending VM exit due to a current value of the single stepping indicator to the VMM.

17. The method of claim 15 wherein the designated software requests the processor to deliver a pending VM exit due to a current value of the pending VM exit indicator to the VMM.

18. The method of claim 15 further comprising:

detecting, after the designated software completes operation, that a VM exit due to a current value of the single-stepping indicator is pending;

transitioning control to the VMM; and informing the VMM that control is transitioned to the VMM due to the current value of the single-stepping indicator.

19. An apparatus comprising:

a data structure controlled by a virtual machine monitor (VMM), the data structure storing a single stepping indicator; and a single stepping logic component to receive a request to transition control to a virtual machine (VM) from a virtual machine monitor (VMM), to determine that the single-stepping indicator is set to a single stepping value, and to perform single-stepping of the VM in response to determining that the single-stepping indicator is set to the single stepping value, the single stepping logic component is to perform the single-stepping by transitioning control to the VM, and, if an execution of a first instruction in the VM completes successfully, transitioning control to the VMM following the successful execution of the first instruction.

20. The apparatus of claim 19 wherein the single stepping logic component is to inform the VMM that control is transitioned to the VMM due to a current value of the single-stepping indicator.

21. The apparatus of claim 19 wherein the single stepping logic component is further to determine whether a current fault caused by the execution of the first instruction is associated with a transition of control to the VMM, and, if the current fault is associated with the transition of control to the VMM, to transition control to the VMM and to inform the VMM that control is transitioned to the VMM due to the current fault.

22. The apparatus of claim 21 wherein the single stepping logic component is further to deliver the current fault to the VM if the current fault is not associated with the transition of control to the VMM, and, if the delivery of the current fault completes successfully, to transition control to the VMM prior to executing any instructions of a corresponding fault handler and to inform the VMM that control is transitioned to the VMM due to a current value of the single-stepping indicator.

23. A system comprising:

a memory to store one or more indicators; and a processor, coupled to the memory, to use the one or more indicators to determine that single stepping of a virtual machine (VM) is indicated, and to automatically perform single-stepping of the VM in response to determining that the single stepping is indicated, the processor is to perform the single-stepping by executing a first instruction in the VM, and, if the execution of the first instruction completes successfully, transitioning control to a virtual machine monitor (VMM) following the successful completion of the execution of the first instruction.

24. The system of claim 23 wherein the processor is to inform the VMM that control is transitioned to the VMM due to a current value of the single-stepping indicator.

25. The system of claim 23 wherein the processor is further to determine whether a current fault caused by the execution of the first instruction is associated with a transition of control to the VMM, and, if the current fault is associated with the transition of control to the VMM, to transition control to the VMM and to inform the VMM that control is transitioned to the VMM due to the current fault.

26. The system of claim 25 wherein the processor is further to deliver the current fault to the VM if the current fault is not associated with the transition of control to the VMM, and, if the delivery of the current fault completes successfully, to transition control to the VMM prior to executing any instructions of a corresponding fault handler and to inform the VMM that control is transitioned to the VMM due to a current value of the single-stepping indicator.

27. An article of manufacture comprising a machine-readable storage medium containing instructions which, when executed by a processing system, cause the processing system to perform a method, the method comprising:
   receiving a request to transition control to a virtual machine (VM) from a virtual machine monitor (VMM);
   determining that a single-stepping indicator is set to a single stepping value; and
   in response to determining that the single-stepping indicator is set to the single-stepping value, automatically performing single stepping of the VM by transitioning control to the VM, and if an execution of a first instruction in the VM completes successfully, transitioning control to the VMM following the successful completion of the execution of the first instruction.

28. The machine-readable storage medium of claim 27 wherein transitioning control to the VMM comprises informing the VMM that control is transitioned to the VMM due to a current value of the single-stepping indicator.

29. The machine-readable storage medium of claim 27 wherein the method further comprises:
   if the execution of the first instruction in the VM does not complete successfully due to a current fault, determining whether the current fault caused by the execution of the first instruction is associated with a transition of control to the VMM.

30. The machine-readable storage medium of claim 29 wherein the method further comprises:
   if the current fault is associated with the transition of control to the VMM, transitioning control to the VMM, and informing the VMM that control is transitioned to the VMM due to the current fault.

* * * * *

UNITED STATES PATENT AND TRADEMARK OFFICE
CERTIFICATE OF CORRECTION

PATENT NO. : 7,356,735 B2　　　　　　　　　　　　　　　　　　　　　Page 1 of 1
APPLICATION NO. : 10/814569
DATED : April 8, 2008
INVENTOR(S) : Bennett et al.

It is certified that error appears in the above-identified patent and that said Letters Patent is hereby corrected as shown below:

In column 13, at line 6 delete, "VMIVI" and insert --VMM--.

Signed and Sealed this

Eighth Day of December, 2009

David J. Kappos
*Director of the United States Patent and Trademark Office*